2,935,501
PROCESS FOR THE PRODUCTION OF LOW-PRESSURE POLYETHYLENE WITH A MOLECULAR WEIGHT OF 500,000 TO 1,500,000

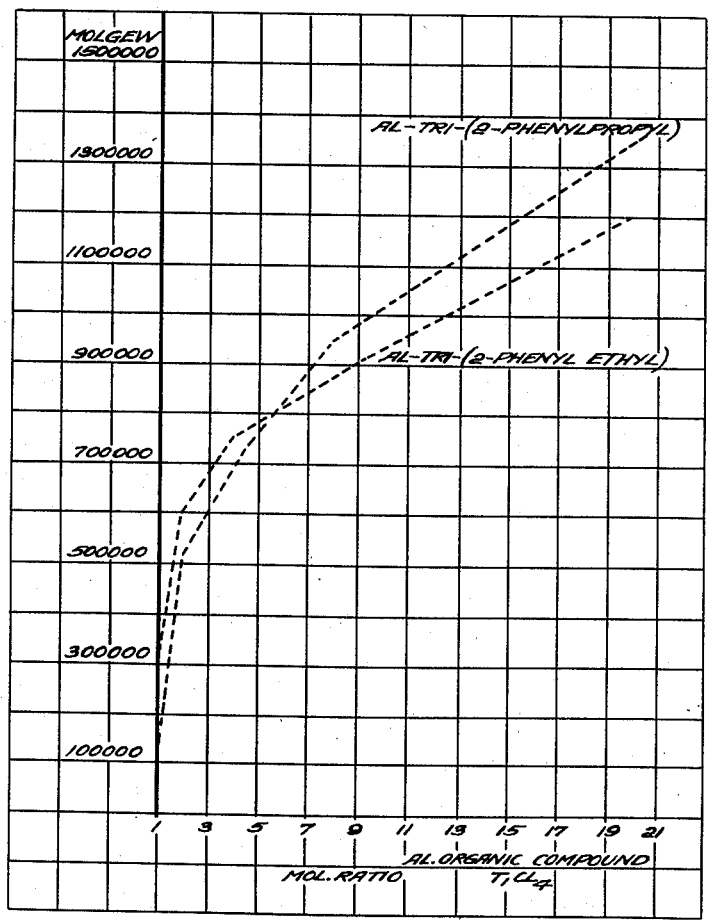

Heinrich Weber, Hans Strache, Franz Broich, Walter Franke, and Klaus Kiepert, all of Marl, Germany, assignors to Chemische Werke Huls Aktiengesellschaft, Marl, Germany, a corporation of Germany Application February 26, 1957, Serial No. 642,589

Claims priority, application Germany February 28, 1956

1 Claim. (Cl. 260—94.9)

This invention relates to the production of low-pressure polyethylene having molecular weight of from 500,000 to 1,500,000 by polymerizing the ethylene by means of a catalyst combination consisting of from 0.05 to 10% by weight of titanium tetrachloride calculated on the weight of the ethylene and from 2 to 25 mols of an aluminum tri-aralkyl of the formula $$Al(CH_2—CHR_1R_2)_3$$

per mol of titanium tetrachloride.

It is known that ethylene can be polymerized to so-called low-pressure polyethylenes, preferably in the presence of diluting agents, at ordinary or slightly increased pressures and at moderate temperatures by means of polymerization catalysts which are formed from compounds of the metals of groups IV to VI of the periodic system including thorium and uranium, on the one hand, and alkali metals, aluminum metal, aluminum hydride or organic compounds of aluminum, magnesium, zinc or alkali metal on the other hand. The low-pressure polyethylenes thus produced have a molecular weight between about 20,000 and 3,000,000, these figures representing not absolute values but only comparison values which can be calculated from viscosity measurements (see Angew. Chem. 67 (1955) 545/6). We will use the so-called reduced viscosity as a standard for the degree of polymerization (see Angew. Chem. 67 (1955) 548).

In addition to polyethylenes with a medium degree of polymerization, polyethylenes with a very high degree of polymerization are gaining increased practical importance. These latter polyethylenes can be produced by means of catalyst-combinations of zirconium halides on the one hand and aluminum-organic compounds on the other hand.

If we use the more readily available titanium tetrachloride instead of the more difficultly obtainable zirconium halides in the catalyst combinations, we can not produce polyethylenes whose reduced viscosities exceed 16.5, corresponding to a molecular weight of over 500,000. Thus, for example, we obtain with a catalyst combination of aluminum trioctyl and titanium tetrachloride in a molar ratio of 2:1 a polyethylene with a molecular weight of a little less than 400,000. If we change the ratio of aluminum trioctyl to titanium tetrachloride, whether upwards or downwards, we arrive only at polymerides with a lower degree of polymerization. The conditions are similar with the catalyst combinations aluminum triethyl/titanium tetrachloride and aluminum diethyl monochloride/titanium tetrachloride.

It has been found that low-pressure polyethylenes with a molecular weight between 500,000 to 1,500,000 can be obtained by polymerization of ethylene by means of a catalyst combination of 0.05 to 10%, preferably 0.2 to 5% by weight of titanium tetrachloride, related to reacted ethylene, and 2 to 25 mols (per mol of titanium tetrachloride) of an aluminum tri-aralkyl of the formula $Al(CH_2—CHR_1R_2)_3$ in which $R_1$ is a phenyl, a methylated phenyl or an ethylated phenyl radical and $R_2$ is a hydrogen atom, a methyl radical, a phenyl radical, a methylated phenyl radical or an ethylated phenyl radical. Examples of suitable aluminum-tri-aralkyls are aluminum tri-(2-phenylethyl), aluminum tri-(2-phenyl-propyl) and aluminum-tri-(2,2-diphenylethyl). The molar ratio of these aluminum-tri-aralkyls to titanium tetrachloride is preferably 2:1 or higher. The degree of polymerization of the polyethylene depends on the nature of the aluminum-tri-aralkyl used and on said molar ratio; it increases with increasing molar ratio.

The polymerization of the ethylene to low-pressure polyethylene is effected in known manner (see Angew. Chem. 67 (1955) 541-547) at temperatures between —20 and 90° C., preferably between 20 and 70° C., and at pressures of 0.2 to 50 atm. in the presence of the 1 to 20-fold, preferably 2 to 10-fold amount of diluting agents under exclusion of oxygen and moisture. As diluting agents are used preferably liquid aliphatic and cycloaliphatic, preferably saturated, hydrocarbons, such as butane, pentane, hexane, heptane, cyclohexane, alkylated cyclohexanes, as well as natural or synthetic hydrocarbon mixtures with low to medium boiling ranges.

The accompanying drawing is a graphic representation of the attainable degree of polymerization plotted against the ratio of the aluminum-organic compounds to titanium tetrachloride in the catalyst combination for various aluminum-tri-aralkyls. It can be seen that it is possible to obtain with the described catalyst combinations of very high degrees of polymerization of a reduced viscosity of from 15 up to reduced viscosity of over 65, corresponding to molecular weights of 500,000 to about 1,500,000.

EXAMPLE 1

In a stirring device washed with nitrogen are charged 5 parts by weight of aluminum-tri-(2-phenyl-propyl) and 25 parts by weight of isopropyl cyclohexane and mixed at 50° C. with 1.24 parts by weight of titanium tetrachloride (molar ratio 2:1) in 25 parts by weight of isopropyl cyclohexane. After letting the mixture stand for a while, we add 950 parts by weight isopropyl cyclohexane and introduce then 250 parts by weight of ethylene under stirring at a temperature of 50° C. in the course of 6 hours, the major part being polymerized. The polymeride thus obtained is treated with 150 parts by weight of isopropyl alcohol, filtered off under nitrogen and washed with isopropyl alcohol. We obtain 230 parts by weight polyethylene with a reduced viscosity of 16.8 (molar weight 505,000).

In a similar manner additional tests were carried out with catalyst combinations of varying composition but constant amounts of aluminum-tri-(2-phenyl propyl). The properties of the polymerides obtained are compiled in Table 1.

Table 1

| Molar ratio, aluminum-tri (2-phenyl-propyl) to titanium tetrachloride | Reduced Viscosity | Molar Weight |
|---|---|---|
| 1:0.5 | 16.8 | 505,000 |
| 1:0.25 | 25.3 | 693,000 |
| 1:0.125 | 42.0 | 950,000 |
| 1:0.05 | 64.0 | 1,400,000 |

EXAMPLE 2

If 250 parts by weight of ethylene are introduced at 50° C., in the course of 5 hours, into 1000 parts by weight of isopropyl cyclohexane containing the reaction product of 5 parts by weight of aluminum-tri-(2-phenyl-ethyl) with 1.38 parts by weight of titanium tetrachloride (molar ratio 2:1), and the polymeride obtained is worked up as described in Example 1, we obtain 227 parts by weight polyethylene with a reduced viscosity of 22 (molar weight 605,000). In a similar manner additional tests were carried out with catalyst combinations of varying composition but constant amounts of aluminum-tri-(2-phenylethyl). The properties of the polymerides obtained are compiled in Table 2.

*Table 2*

| Molar Ratio, aluminum-tri-(2-phenylethyl to titanium tetrachloride) | Reduced Viscosity | Molar Weight |
|---|---|---|
| 1:0.5 | 22 | 605,000 |
| 1:0.25 | 28 | 750,000 |
| 1:0.125 | 36 | 875,000 |
| 1:0.05 | 57 | 1,200,000 |

EXAMPLE 3

If 250 g. of ethylene are introduced at 50° C. in the course of 6 hours, into 1000 parts by weight of isopropyl cyclohexane, containing the reaction products of 5 parts by weight of aluminum-tri-(2-phenylethyl) with 0.83 part by weight of titanium tetrachloride (molar ratio 2:1) and the resulting polymeride is worked up as described in Example 1, we obtain 201 parts by weight of polyethylene with a reduced viscosity of 29 (molar weight 740,000).

We claim:

Process for the production of low-pressure polyethylene with a molecular weight between 500,000 and 1,500,000 by the polymerization of ethylene by means of a catalyst combination of from 0.05% to 10% by weight of titanium tetrachloride, related to reacted ethylene, and from 2 to 25 moles per mol of titanium tetrachloride of an aluminum-tri-aralkyl of the general formula $Al(CH_2.CHR_1R_2)_3$ in which $R_1$ is a member of the group consisting of a phenyl radical, a methylated phenyl radical and an ethylated phenyl radical, and $R_2$ is a member of the group consisting of a hydrogen atom, a methyl radical, a phenyl radical, a methylated phenyl radical and an ethylated phenyl radical.

References Cited in the file of this patent

UNITED STATES PATENTS

| 2,845,414 | Schutze | July 29, 1958 |

FOREIGN PATENTS

| 534,792 | Belgium | Jan. 31, 1955 |